US012716284B2

(12) United States Patent
Fu et al.

(10) Patent No.: US 12,716,284 B2
(45) Date of Patent: Aug. 25, 2026

(54) VEHICLE, WINDOW GLASS LIFTER, AND SLIDER DEVICE OF WHICH

(71) Applicants: Inteva Products LLC, Troy, MI (US); INTEVA PRODUCTS ZHENJIANG CO., LTD, Zhenjiang (CN)

(72) Inventors: Qiangxi Fu, Zhenjiang (CN); Sun Liang, Zhenjiang (CN); Yifan Fan, Zhenjiang (CN)

(73) Assignees: INTEVA PRODUCTS LLC, Troy, MI (US); INTEVA PRODUCTS ZHENJIANG CO., LTD, Zhenjiang (CN)

( * ) Notice: Subject to any disclaimer, the term of this patent is extended or adjusted under 35 U.S.C. 154(b) by 0 days.

(21) Appl. No.: 19/062,900

(22) Filed: Feb. 25, 2025

(65) Prior Publication Data

US 2025/0270865 A1 Aug. 28, 2025

(30) Foreign Application Priority Data

Feb. 28, 2024 (CN) ......................... 202410225460.8
Feb. 28, 2024 (CN) ......................... 202420376033.5

(51) Int. Cl.
*E05F 11/38* (2006.01)
*E05F 15/689* (2015.01)

(52) U.S. Cl.
CPC ........ *E05F 11/385* (2013.01); *E05F 15/6892* (2024.01); *E05Y 2900/55* (2013.01)

(58) Field of Classification Search
CPC ..... E05F 11/385; E05F 11/382; E05F 11/483; E05F 11/488; E05F 11/445; E05F 2011/387; E05F 15/689
See application file for complete search history.

(56) References Cited

U.S. PATENT DOCUMENTS 6,453,617 B1 * 9/2002 Klippert ................ E05F 11/385 49/375
8,453,383 B2 * 6/2013 Barr ...................... E05F 11/385 49/374

(Continued)

*Primary Examiner* — Justin B Rephann
(74) *Attorney, Agent, or Firm* — CANTOR COLBURN LLP

(57) ABSTRACT

The present application provides a vehicle, a window glass lifter, and a slider device of which, the slider device includes: a slider body, an engagement plate, a clamping assembly, and a locking member; the clamping assembly includes a first clamping member and a second clamping member, an adjuster is arranged between the first clamping member and the slider body, and the second clamping member is engaged on the engagement plate; side surfaces of the first clamping member and the second clamping member attached to the window glass, and side surfaces of the first clamping member and the second clamping member away from the window glass, a side surface of the slider body facing the first clamping member, and a side surface of the engagement plate facing the second clamping member are curved surfaces; the second clamping member adaptively slides on the engagement plate with changing of a position of the first clamping member, the side surfaces of the first clamping member and the second clamping member attached to the window glass are parallel to each other after the window glass is placed on the clamping assembly; and the locking member is sequentially passed through the slider body, the first clamping member, the second clamping member, and the engagement plate, to adjust a distance between the slider body and the engagement plate and to clamp the window glass.

14 Claims, 7 Drawing Sheets

(56) References Cited

U.S. PATENT DOCUMENTS

| | | | | |
|---|---|---|---|---|
| 8,756,866 | B2 * | 6/2014 | Lee | E06B 3/5481 49/375 |
| 11,162,291 | B2 * | 11/2021 | Reames | E05F 11/488 |
| 11,168,501 | B2 * | 11/2021 | Pavlovic | E05F 11/382 |
| 11,577,583 | B2 * | 2/2023 | Barr | B60J 1/17 |
| 11,674,347 | B2 * | 6/2023 | Arimoto | B60J 1/17 49/404 |
| 12,152,422 | B2 * | 11/2024 | Fairchild | E05F 15/689 |
| 12,196,025 | B2 * | 1/2025 | Pavlovic | B60J 5/0416 |
| 12,467,303 | B2 * | 11/2025 | Barr | E05F 11/385 |
| 2004/0088924 | A1 * | 5/2004 | Moser | E05F 11/385 49/375 |
| 2009/0223133 | A1 * | 9/2009 | Miu | E05F 11/385 49/375 |
| 2010/0043297 | A1 * | 2/2010 | Barr | E05F 11/385 24/458 |
| 2018/0326820 | A1 * | 11/2018 | Huang | E05F 11/385 |
| 2020/0173212 | A1 * | 6/2020 | Pavlovic | E05F 11/385 |
| 2020/0338965 | A1 * | 10/2020 | Barr | B60J 1/17 |
| 2020/0386026 | A1 * | 12/2020 | Reames | E05F 11/385 |
| 2022/0314762 | A1 * | 10/2022 | Barr | E05F 11/385 |
| 2023/0027803 | A1 * | 1/2023 | Arimoto | E05D 15/165 |
| 2023/0151664 | A1 * | 5/2023 | Fairchild | E05F 15/689 49/360 |
| 2023/0295973 | A1 * | 9/2023 | Pavlovic | E05F 15/6892 49/348 |

* cited by examiner

VEHICLE, WINDOW GLASS LIFTER, AND SLIDER DEVICE OF WHICH

CROSS REFERENCE TO RELATED APPLICATIONS

The present application claims priority under 35 U.S.C. § 119 to the following Chinese Patent Application Nos. 202410225460.8, filed on Feb. 28, 2024 and 202420376033.5, filed on Feb. 28, 2024, the entire contents each of which are incorporated herein by reference thereto.

TECHNICAL FIELD

The present application relates to the technical field of vehicles, and more particularly to a vehicle, a window glass lifter, and a slider device of which.

BACKGROUND

At present, more and more vehicles are used in the market. Whether electric vehicles, fuel vehicles or hybrid vehicles, when the vehicle doors are manufactured, it is necessary to ensure that the glass inside the vehicle door is sealed with the door frame or the vehicle body after lifting. Therefore, when lifting the window glass, a device is needed to not only clamp the window glass, but also adjust the assembly angle of the window glass.

SUMMARY

An object of embodiments of the present application is to provide a vehicle, a window glass lifter, and a slider device of which, so as to solve the technical problems of clamping and pre-bending angle during lifting the glass in related technologies.

In order to achieve above object, the technical solution adopted in embodiments of the present application is:

In a first aspect, the present application provides a slider device for a window glass lifter, and the slider device includes: a slider body, an engagement plate, a clamping assembly, and a locking member; the engagement plate is connected at interval with the slider body to form an accommodation space; the clamping assembly is placed in the accommodation space and including a first clamping member and a second clamping member for clamping the window glass, an adjuster is arranged between the first clamping member and the slider body, and the second clamping member is engaged on the engagement plate; side surfaces of the first clamping member and the second clamping member attached to the window glass, and side surfaces of the first clamping member and the second clamping member away from the window glass are respectively curved surfaces of opposite bending directions; the slider body is provided with a curved surface configured for matching with the first clamping member, the engagement plate is provided with a curved surface configured for matching with the second clamping member, the second clamping member adaptively slides on the engagement plate with changing of a position of the first clamping member, the side surfaces of the first clamping member and the second clamping member attached to the window glass are parallel to each other after the window glass is placed on the clamping assembly; and the locking member is sequentially passed through the slider body, the first clamping member, the second clamping member, and the engagement plate, the locking member is configured to adjust a distance between the slider body and the engagement plate until the first clamping member and the second clamping member are parallel to each other and clamping the window glass.

Embodiments of the present application have at least the following beneficial effects with respect to the related technologies: the opposite surfaces of the slider body and the first clamping member are concave and convex respectively, and the opposite surfaces of the engagement plate and the second clamping member are also concave and convex respectively. When the first clamping member and the second clamping member are placed vertically in a first direction into the accommodating space, the matching surfaces are parallel, by moving the position of the first clamping member on the slider body, the second clamping member adaptively moves on the engagement plate to the position corresponding to the slider body, so as to adjust the tilt angle of the window glass relative to the horizontal plane.

In some embodiments of the present application, the adjuster includes a first rack and a second rack configured for fixing a relative position between the slider body and the first clamping member;

- the first rack is arranged on a curved surface of the slider body facing the first clamping member, the second rack is arranged on a curved surface of the first clamping member facing the slider body, and the first rack and the second rack are meshed with each other.

In some embodiments of the present application, the adjuster includes an adjusting bolt and an adjusting nut, and the slider body is provided with a first groove configured for accommodating the adjusting bolt; the adjusting bolt is provided with a first limiting sheet and a curved moving block provided with an internal thread, the adjusting bolt is restricted inside the first groove through the first limiting sheet, the first groove is matched with the adjusting bolt to restrict a rotating freedom of the moving block, and the adjusting nut is connected to the adjusting bolt from a bottom of the slider body; and the first clamping member is provided with two sets of claws for matching with the moving block, and the moving block is arranged between the two sets of claws.

In some embodiments of the present application, the slider body is provided with a first sliding groove, the first sliding groove is provided with a scale bar along a height direction of the slider body, the first clamping member is provided with a first buckle engaged to the first sliding groove, and the first buckle is provided with an indication line corresponding to the scale bar to read positions.

In some embodiments of the present application, the scale bar has a maximum limit scale and a minimum limit scale, the first clamping member moves from the minimum limit scale to the maximum limit scale, the first clamping member moves up several unit angles along an arc direction of the slider body, and the locking member is matched with the window glass to drive the second clamping member to slide along an arc direction of the engagement plate.

In some embodiments of the present application, the slider body is provided with a first circular hole, the engagement plate is provided with a second circular hole, the second clamping member is provided with a first strip groove, the first clamping member is provided with a second strip groove; and the first clamping member is arranged on the maximum limit scale or the minimum limit scale, and the second strip groove and the first strip groove are at least sufficient passing through the locking member to connect the slider body and the engagement plate.

In some embodiments of the present application, the engagement plate is provided with a second sliding groove; and the second clamping member is provided with a second buckle engaged to the second sliding groove, during the locking member is connected to the slider body and the engagement plate, the second clamping member adaptively adjusts a position in the second sliding groove according to a position of the first clamping member.

In some embodiments of the present application, both the first clamping member and the second clamping member are provided with a second groove for increasing elasticity, and the second groove is arranged a position adjacent to the first buckle or the second buckle.

In some embodiments of the present application, the second circular hole is a threaded hole, the locking member is a spindle bolt with a second limiting sheet, the spindle bolt passes through the slider body, the first clamping member, and the second clamping member, and is connected to the second circular hole of the engagement plate; and the second limiting sheet is abutted against an outer surface of the slider body.

In some embodiments of the present application, the slider body is provided with a connection portion extending from the slider body to the engagement plate, and the engagement plate is provided with a matching portion engaged to the slider body; or the engagement plate is provided with a connection portion extending from the engagement plate to the slider body, and the slider body is provided with a matching portion engaged to the engagement plate.

In some embodiments of the present application, the connection portion includes a guide column and a connecting column; and the connecting column is provided with a center hole; the matching portion comprises an alignment hole for connecting the center hole and a guide hole for matching with the guide column; a side of the alignment hole toward a position for assembly connection is provided with a projection for inserting in the center hole; and the slider device further includes a connecting member sequentially passing through the center hole and the alignment hole to connect the slider body and the engagement plate, and to limit a movement and rotation direction of the engagement plate relative to the slider body.

In some embodiments of the present application, the engagement plate is provided with a stiffener for increasing a rigidity of the engagement plate.

In some embodiments of the present application, one end of the first clamping member for inserting the window glass is provided with a first guide portion that intersects the first clamping member at an obtuse angle; and one end of the second clamping member for inserting the window glass is provided with a second guide portion that intersects the second clamping member at an obtuse angle.

In a second aspect, the present application provides a window glass lifter, which includes: at least one slider device according to any one of above embodiments; and at least one guide rail, each of which is provided with at least one slider device for clamping a window glass.

In a third aspect, the present application provides a vehicle, which includes a vehicle door; the vehicle door comprises a window glass and a window glass lifter according to above embodiment placed inside the vehicle door, and the window glass lifter includes a slider device and a guide rail; and the slider device clamps the window glass to move along the guide rail.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
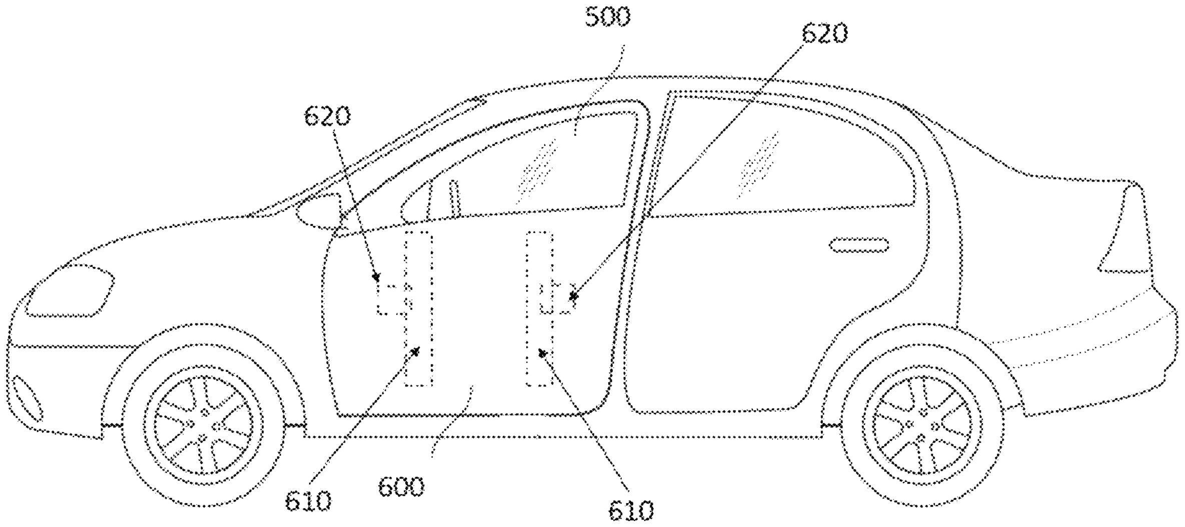
FIG. 1 is a schematic diagram of a vehicle applied with a window glass lifter in one embodiment provided by the present application.

In drawings, reference signs are listed as following:

100—slider body; 110—front of slider; 120—rear of slider; 130—first sliding groove; 140—scale bar; 141—maximum limit scale; 142—minimum limit scale; 150—first side surface; 160—second side surface; 170—first circular hole; 180—connection portion; 181—guide column; 182—connection column; 182*a*—center hole; 190—first groove;

200—engagement plate; 210—accommodation space; 220—rear of plate; 230—front of plate; 240—second circular hole; 250—second sliding groove; 260—matching portion; 261—alignment hole; 261*a*—protrusion; 262—guide hole; 270—connecting member; 280—stiffener;

300—clamping assembly; 310—first clamping member; 311—first mating surface; 312—second mating surface; 313—claw; 313*a*—engagement groove; 314—first buckle; 314*a*—indication line; 314*b*—fastening portion; 314*c*—engagement portion; 315—second strip groove; 316, 325—second groove; 317 arc—shaped groove; 318—first guide portion; 320—second clamping member; 321—third mating surface; 322—fourth mating surface; 323—first strip groove; 324—second buckle; 326—second guide portion; 330—adjuster; 331—first rack; 332—second rack; 333—adjusting bolt; 333*a*—first limiting sheet; 333*b*—curved moving block; 334—adjusting nut;

400—locking member; 410—spindle bolt; 420—second limiting sheet;

500—window glass;

U—first direction;

B—second direction;

A—third direction;

R—fourth direction; and

600—vehicle door; X—window glass lifter; 610—guide rail; 620—slider device.

DETAILED DESCRIPTION OF EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

In the description of the present application, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

As shown in FIG. 1, which is a schematic diagram of the overall structure of a slider device for window glass lifter applied to the vehicle, the vehicle includes a vehicle door 600, the vehicle door 600 includes a window glass 500 and a window glass lifter X, the window glass lifter X includes a guide rail 610 and a slider device 620, at least one slider device 620 for clamping the window glass 500 is provided on each guide rail 610.

Figure 2:
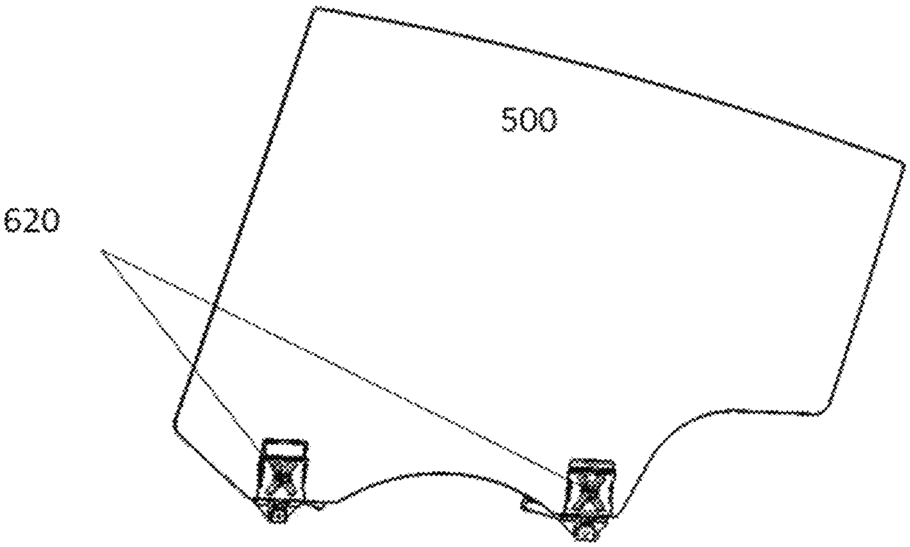
FIG. 2 is a schematic diagram of a connection relationship between a window glass and a window glass lifter in FIG. 1.

As shown in FIG. 2, the guide rail 610 refers to a track that facilitates the movement of the slider device 620. At least one slider device 620 is provided on each guide rail 610, and the guide rail 610 is installed inside the vehicle door 600.

The following is a detailed description of the structure of the slider device 620 for the window glass lifter.

Figure 3:
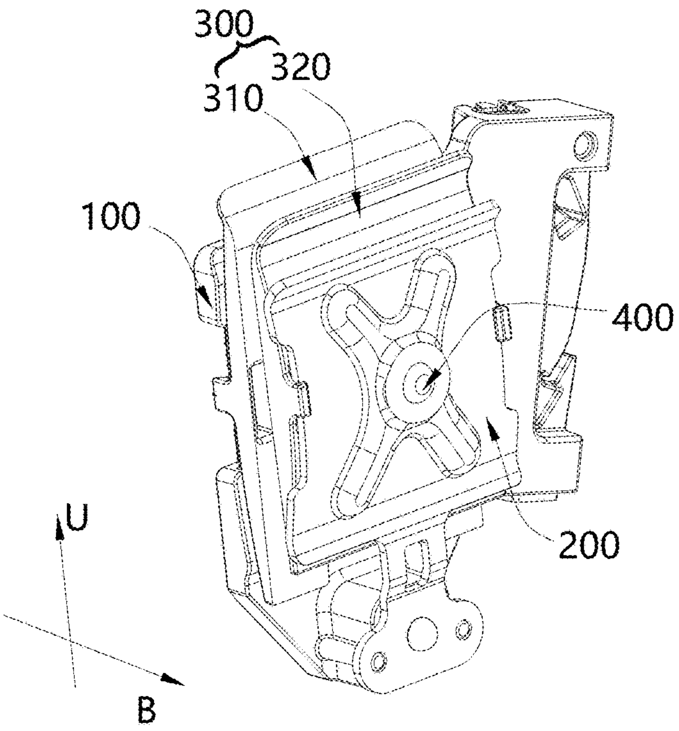
FIG. 3 is a perspective view from an angle of a slider device for a window glass lifter provided in one embodiment of the present application.
Figure 5:
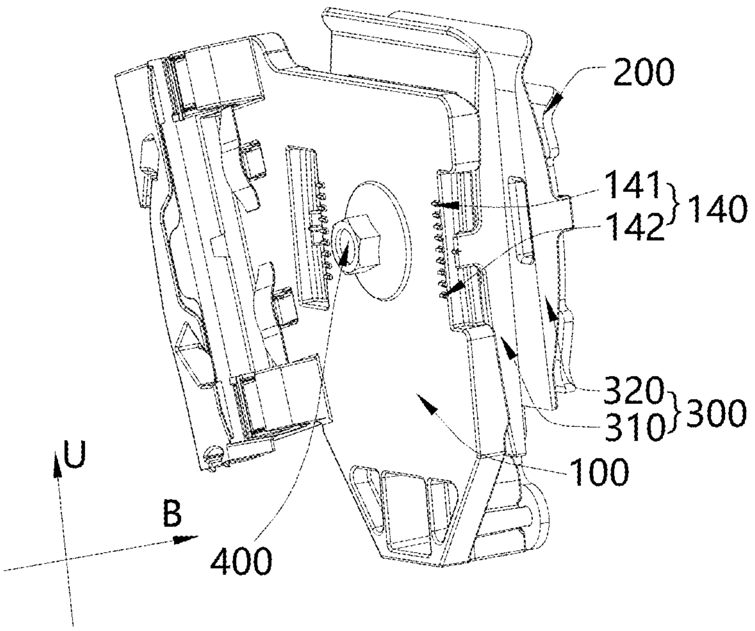
FIG. 5 is a perspective view from another angle of a slider device for a window glass lifter in one embodiment provided by the present application.

The present application provides a slider device 620 for a window glass lifter, as shown in FIGS. 3 and 5. The device includes a slider body 100, an engagement plate 200, a clamping assembly 300 and a locking member 400. The window glass 500 is placed inside the clamping assembly 300, the locking member 400 sequentially passes through the slider body 100, the clamping assembly 300, the window glass 500 and the engagement plate 200, to adjust the distance between the slider body 100 and the engagement plate 200, so as to press the window glass 500 in the clamping assembly 300, and to realize fixing the position of the window glass 500.

Figure 4:
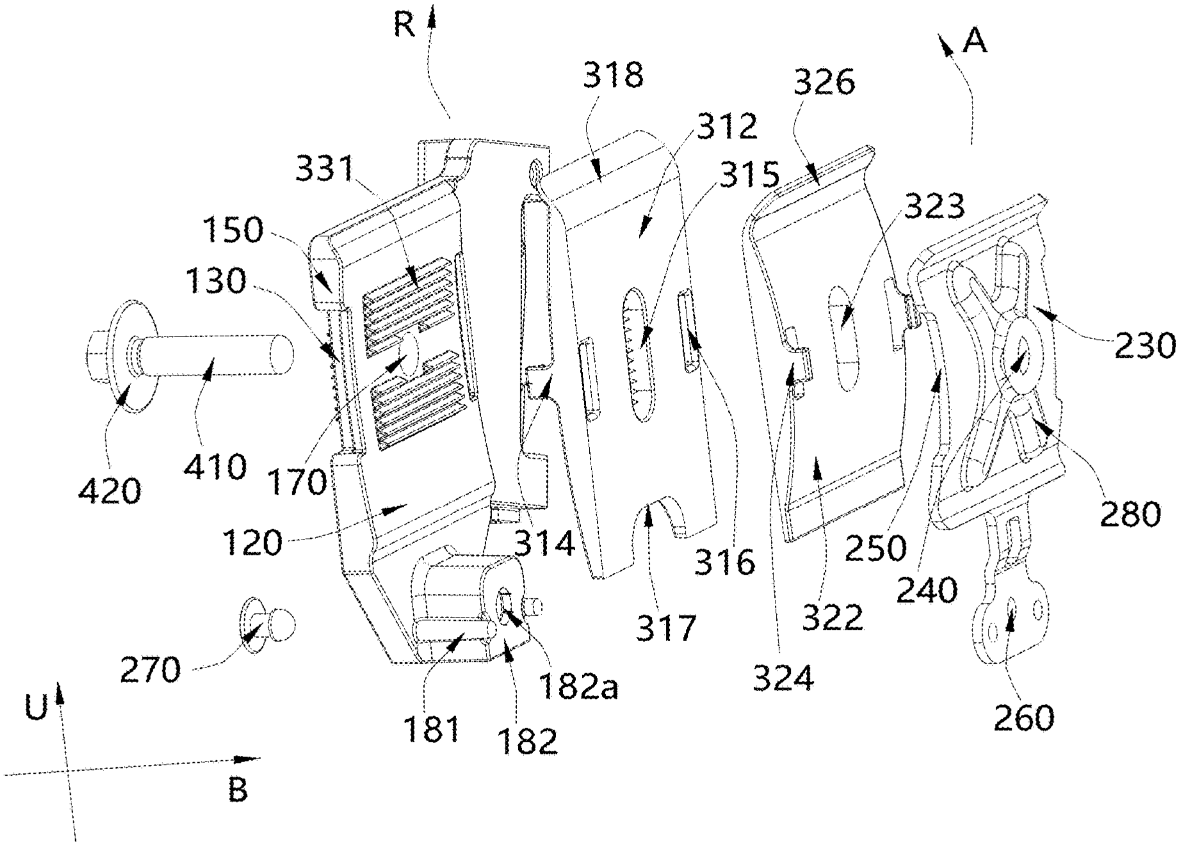
FIG. 4 is an exploded view of FIG. 3.
Figure 6:
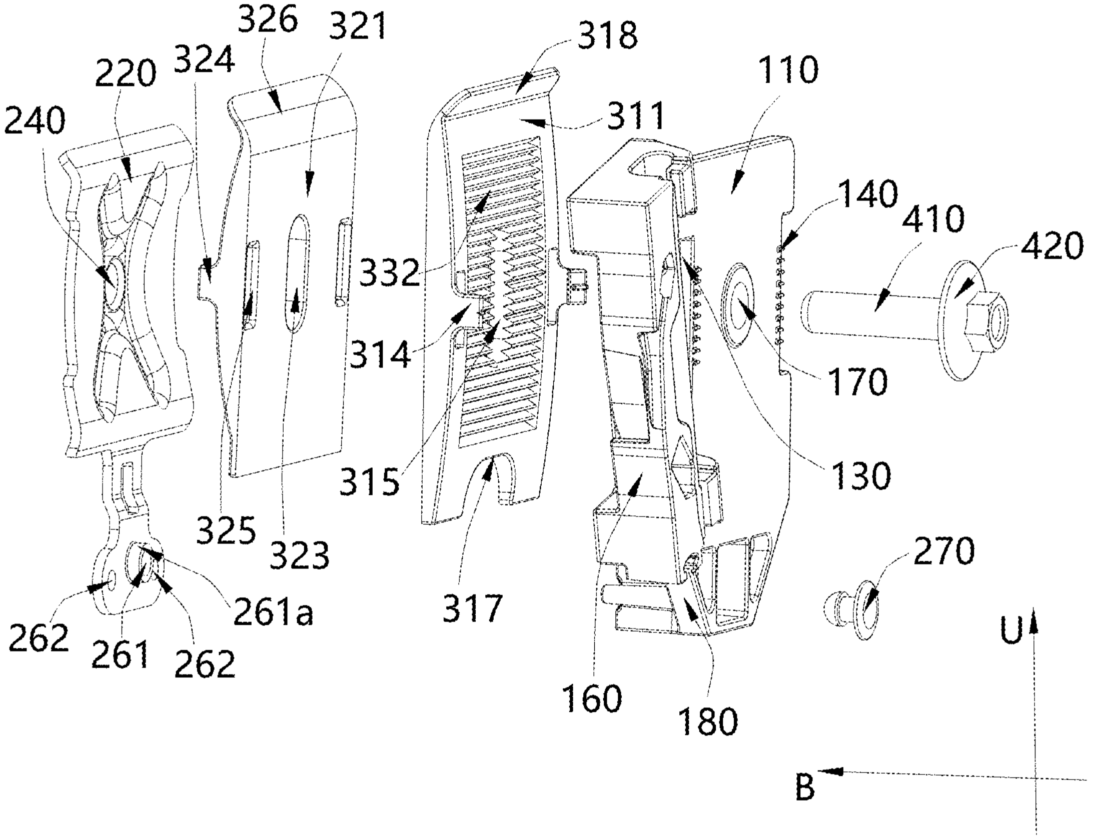
FIG. 6 is an exploded view of FIG. 5.

The slider body 100 is a part used for the clamping assembly 300 to provide support when clamping the window glass 500. As shown in FIG. 4 and FIG. 6, the slider body 100 has a front of slider 110 and a rear of slider 120 opposite to the front of slider 110, and the front of slider 110 is exposed externally. The rear of slider 12 is attached to the clamping assembly 300. In the embodiment, the rear of slider 120 is a curved surface, and the curved surface can be concave or convex, or the slider body 100 is concave/convex along the rear of slider 120 pointing to the front of slider 110, so as to facilitate the matching with the clamping assembly 300.

Figure 11:
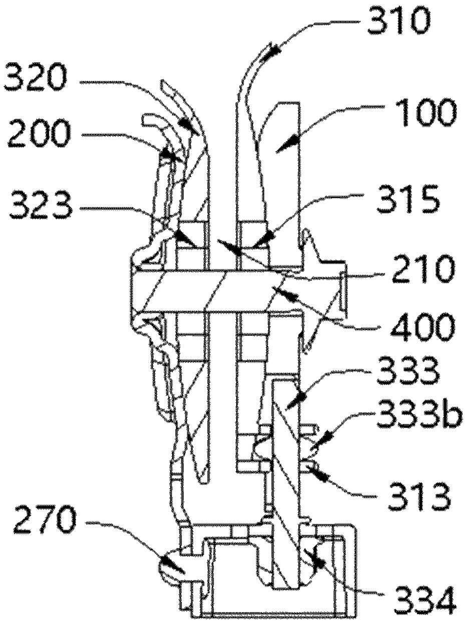
FIG. 11 is a sectional view of FIG. 7.

The engagement plate 200 is a part used for the clamping assembly 300 to provide support when clamping the window glass 500. An accommodation space 210 is formed by connecting the engagement plate 200 and the slider body 100 at interval (see FIG. 11). As shown in FIG. 4 and FIG. 6, the engagement plate 200 has a rear of plate 220 and a front of plate 230 arranged opposite to each other, the rear of plate 220 faces the rear of slider 120, and the front of the plate is exposed externally. The connection at interval refers to the fixed connection between the engagement plate 200 and the slider body 100 when there is a distance between the rear of plate 220 and the rear of slider 120. The connection at interval can be achieved by a slider body 100 provided with one or more extension members (not shown in the figures), and another free end of the extension member is connected with the engagement plate 200. The engagement plate 200 can also be provided with one or more extension members (not shown in the figures), and another free end of the extension member is connected with the slider body 100. It should be noted that the engagement plate 200 and the slider body 100 can be formed in one piece or can be detachable. Where, the rear of plate 220 is a curved surface, and the curved surface can be concave or convex, or the engagement plate 200 is concave/convex in the direction of the rear of plate 220 towards the front of plate 230, so as to facilitate the matching of the clamping assembly 300.

The clamping assembly 300 refers to an assembly used to clamp the window glass 500. The force is provided by the slider body 100 and the engagement plate 200 on both sides to press the window glass 500. As shown in FIGS. 4 and 6, the clamping assembly 300 includes a first clamping member 310, a second clamping member 320, and an adjuster 330. The first clamping member 310 is connected with the slider body 100, and the relative position of the first clamping member 310 and the slider body 100 is adjusted by the adjuster 330. The second clamping member 320 is engaged with the engagement plate 200. The first clamping member 310 includes a first mating surface 311 and a second mating surface 312 arranged opposite to each other. The first mating surface 311 is curved surface and faces the rear of slider 120 and matches with the slider body 100. The second mating surface 312 faces the second clamping member 320. The second clamping member 320 includes a third mating surface 321 and a fourth mating surface 322 arranged opposite to each other, the third mating surface 321 faces the first clamping member 310, the fourth mating surface 322 is curved surface and faces the rear of plate 220, and matches with the engagement plate 200. For example, the first mating surface 311 and the fourth mating surface 322 are convex, and the rear of plate 220 and rear of slider 120 are concave; the first mating surface 311 matches with the rear of slider 120, the fourth mating surface 322 matches with the rear of plate 220. After the slider device 620 clamps the window glass 500, the second mating surface 312 and the third mating surface 321 are parallel to each other.

The locking member 400 refers to a part to compress the window glass 500 by adjusting the distance between the slider body 100 and the engagement plate 200. The locking member 400 can be a bolt or an I-shaped connector that can adjust the distance.

The installation process of clamping the window glass 500 with the slider device for the window glass lifter is as follows: For example, the first mating surface 311 and fourth mating surface 322 are convex, and the rear of slider 120 and rear of plate 220 are concave; the first clamping member 310 slides on the slider body 100 in a fourth direction R, and the second clamping member 320 moves on the engagement plate 200 in a third direction A. The fourth direction R refers to the arc direction raised along the first mating surface 311/the arc direction sunken along the rear of slider 120. The third direction A refers to the arc direction raised along the fourth mating surface 322/sunken along the rear of plate 220.

As shown in FIG. 3 to FIG. 6, the first clamping member 310 is firstly matched with the slider body 100, the relative position between the first clamping member 310 and the slider body 100 is adjusted through the adjuster and fixed; the second clamping member 320 is then fastened on the engagement plate 200, and then the slider body 100 and the engagement plate 200 are connected at the bottom of both; the window glass 500 is then placed inside the accommodation space 210 between the slider body 100 and the engagement plate 200; finally, the locking member 400 sequentially passes through the slider body 100, the first clamping member 310, the window glass 500, the second clamping member 320, and the engagement plate 200 to adjust the distance between the slider body 100 and the engagement plate 200 to press and fix the window glass 500. By adjusting the position of the first clamping member 310 relative to the slider body 100, the second clamping member 320 can adaptably rotate the engagement plate 200 in the third direction A to the position matching the first clamping member 310.

Specifically, when the locking member 400 decreases the distance between the slider body 100 and the engagement plate 200 to clamp the window glass 500 through the first clamping member 310 and second clamping member 320, the first mating surface 311 is attached to the rear of slider 120, and the fourth mating surface 322 is attached to the rear of plate 220. When the relative position between the first clamping member 310 and the slider body 100 is adjusted, the locking member 400 is released first to increase the distance between the slider body 100 and the engagement plate 200; the first clamping member 310 is then move up or down on the slider body 100 along the fourth direction R for a certain distance, and locking member 400 is then fastened gain and reduce the distance between the slider body 100 and the engagement plate 200. During the fastening of the locking member 400, the second clamping member 320 can move in the third direction A adaptively on the engagement plate 200, so that the third mating surface 321 and second mating surface 312 can press the window glass 500.

In order to explain clearly the mutual position relationship above mentioned, the present embodiment takes the first clamping member 310 moving up as an example to explain the specific position angle, while the first clamping member 310 moves down and angle change are opposite. The last position of the first clamping member 310 moves some distance in the direction of the fourth direction R relative to the position before moving, and then the second clamping member 320 moves some distance in the direction away from the third direction A.

The beneficial effects of the technical solution provided in the embodiment over the prior art are: the first clamping member 310 and the second clamping member 320 for clamping window glass 500 are added between the slider body 100 and the engagement plate 200, so that when the slider body 100 and the engagement plate 200 respectively press the window glass 500, the force on both sides of the window glass 500 is more uniform, and the security of the window glass 500 is improved. In the embodiment, the opposite side surfaces of the slider body 100 and the first clamping member 310 (the opposite side surfaces are the facing side surfaces, or the attaching side surfaces of the two after the locking member 400 is fastened) are concave and convex, respectively. The opposite side surfaces of the engagement plate 200 and the second clamping member 320 are also concave and convex, respectively. When the first clamping member 310 and the second clamping member 320 are placed vertically in the accommodation space 210 along the first direction U, the second mating surface 312 is parallel to the third mating surface 321, and by moving the position of the first clamping member 310 on the slider body 100, the second clamping member 320 move adaptively on the engagement plate 200 to the position corresponding to the first clamping member 310, so as to adjust the tilt angle of the window glass 500 relative to the horizontal plane.

In some embodiments, the thickness of the engagement plate 200 is less than the thickness of the slider body 100.

Preferably, the engagement plate 200 is a thin steel plate that enables the locking member 400 to reduce the distance between the slider body 100 and the engagement plate 200. The engagement plate 200 can undergo elastic deformation and is convenient for clamping the clamping assembly 300 with the slider body 100.

In some embodiments, as shown in FIGS. 4 and 6, the adjuster 330 includes a plurality of first racks 331 and second racks 332, The first racks 331 are arranged on the curved surface of the slider body 100 facing the first clamping member 310. The second racks 332 are arranged on the curved surface of the first clamping member 310 facing the slider body 100, and the first racks 331 and the second racks 332 are engaged to fix the relative position of the slider body 100 and the first clamping member 310.

As shown in FIG. 4, the first rack 331 protrudes from the rear of slider 120 of the slider body 100 towards the first clamping member 310 and is arranged on the rear of slider 120 of the slider body 100 along the first direction U. The number of first rack 331 can be one or multiple. If multiple first racks 331 are provided, no spacing or a spacing is existed between two adjacent first racks 331. If there is a spacing between two adjacent first racks 331, the cross section of first rack 331 can be a triangle, a rectangle, or other shapes, which is not limited herein. In the schematic diagram of the embodiment, the cross section of first rack 331 is taken as a triangle for illustrative explanation, which is not limited herein.

As shown in FIG. 6, the second rack 332 protrudes from the first mating surface 311 of the engagement plate 200 towards the slider body 100 and is arranged on the first mating surface 311 of the first clamping member 310 along the first direction U. The number and shape of the second rack 332 are consistent with that of the first rack 331. If multiple second racks 332 are provided, the spacing between second racks 332 is equal to a width of the first rack 331 (the width refers to a length of the first rack 331 along the first direction U), and a width of the second rack 332 is equal to the spacing of two adjacent first racks 331.

When the rear of slider 120 of the slider body 100 is attached with the first mating surface 311 of the first clamping member 310, the first rack 331 is inserted into the tooth spacing of two adjacent second racks 332, and the second rack 332 is inserted into the tooth spacing of two adjacent first racks 331, so as to restrict the degree of freedom of the first clamping member 310 in the first direction U of the slider body 100, while the degree of freedom in the second direction B of the first clamping member 310 is indirectly restricted through the locking member 400, and the second direction B refers to the direction perpendicular to the slider body 100. The indirect restriction refers to that the locking member 400 decreases the distance between the slider body 100 and the engagement plate 200 to press the window glass 500 through the first clamping member 310 and the second clamping member 320, so as to restrict the degree of freedom of the first clamping member 310 along the second direction B.

When the relative position between the slider body 100 and the first clamping member 310 needs to be adjusted, the locking member 400 is released, and in a case that the second rack 332 and the first rack 331 are not engaged, the first clamping member 310 is moved, the second rack 332 and the first rack 331 are then engaged, so that the slider body 100 and the first clamping member 310 are assembled. The locking member 400 is then fastened to fix the relative position of the slider body 100 and the first clamping member 310. During the fastening of the locking member 400, the second clamping member 320 will move on the engagement plate 200 according to the position of the first clamping member 310 after moving.

In the present embodiment, the first rack 331 on the slider body 100 is engaged with the second rack 332 on the engagement plate 200 to fix the relative position of the slider body 100 and the engagement plate 200, and during the releasing of the locking member 400, the relative position of the first clamping member 310 and the slider body 100 can be adjusted in the fourth direction R.

Figure 7:
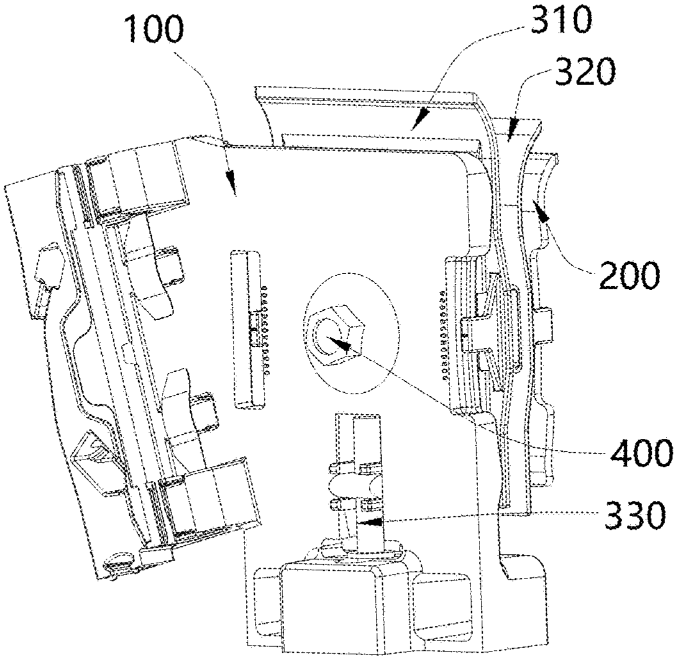
FIG. 7 is a schematic diagram of an overall structure of a slider device for a window glass lifter in another embodiment provided by the present application.
Figure 10:
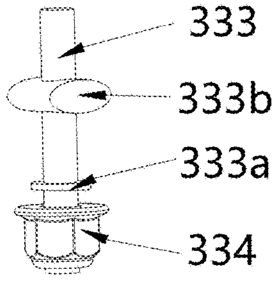
FIG. 10 is a schematic diagram of an overall structure of an adjuster in FIG. 7.

In some embodiments, as shown in FIGS. 7 and 10, the adjuster 330 includes an adjusting bolt 333 and an adjusting nut 334, the adjusting bolt 333 is fixed to the slider body 100, the first clamping member 310 is attached to the adjusting bolt 333, the adjusting bolt 333 first drives the first clamping member 310 to move up and down along the curved surface by clockwise/counterclockwise rotation, to adjust the first clamping member 310 to the ideal position, the adjusting nut 334 is fastened to fix the adjuster 330 to the slider body 100.

Figure 8:
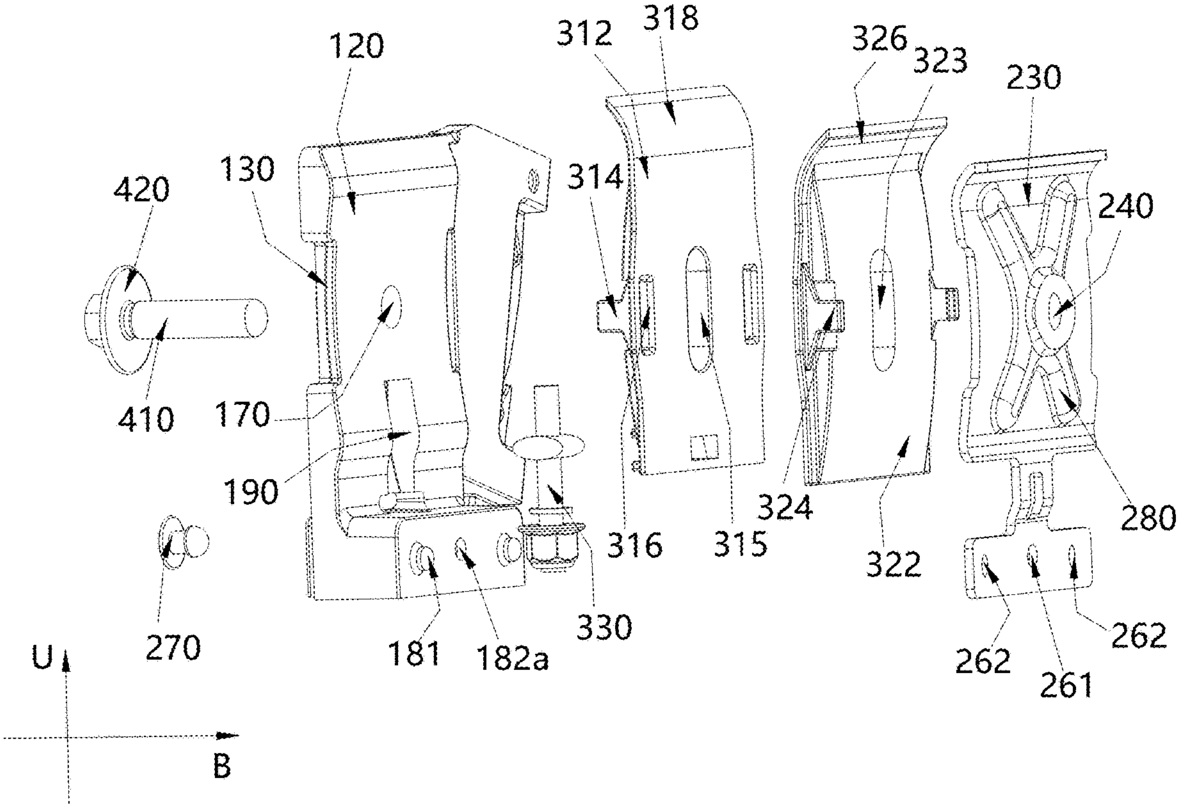
FIG. 8 is an exploded view from one perspective of FIG. 7.
Figure 9:
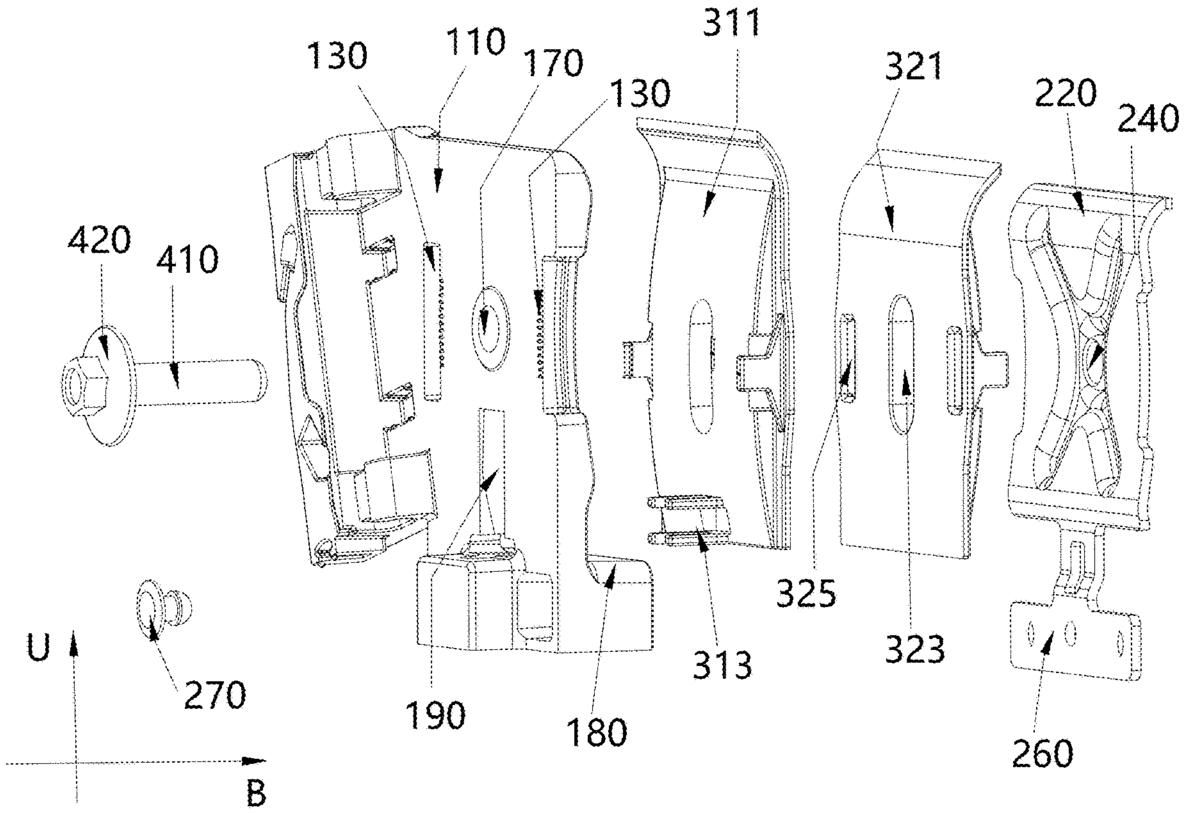
FIG. 9 is an exploded view from another perspective of FIG. 7.

Specifically, as shown in FIG. 8 or 9, the slider body 100 is provided with a first groove 190 of the adjusting bolt 333, which is arranged at the bottom of the slider body 100 penetrating through the slider body 100.

As shown in FIG. 10, the adjusting bolt 333 is provided with a first limiting sheet **333*a* and a curved moving block 333*b* with an internal thread. The first limiting sheet 333*a* is arranged at the middle and lower part of the adjusting bolt 333, the adjusting bolt 333 is divided into a connecting section and an adjusting section, and the curved moving block 333*b* is arranged at the connecting section. The width of the curved moving block 333*b* is close to or equal to the width of the first groove 190, which prevents the curved moving block 333*b* from rotating inside the first groove 190. Due that the curved moving block 333*b* and adjusting bolt 333 are connected through threads, the curved moving block 333*b*** moves up and down in the connection section by rotating the adjusting section.

Further, the first groove 190 is provided with a baffle plate (not shown in the figure), and the baffle plate is provided with a through hole, a diameter of the through hole is larger than a diameter of the adjusting bolt 333, but smaller than a diameter of the first limiting sheet **333*a*; which prevents the adjusting bolt 333 from moving up and down within the first groove 190. When the adjusting section of the adjusting bolt 333 is placed from the first groove 190, the first limiting sheet 333*a* is abutted against the baffle plate, the adjusting section is placed below the baffle plate, and the connecting section is placed above the baffle plate; the adjusting nut 334 is connected to the adjusting section from the lower part of the baffle plate to fasten and fix the adjusting bolt 333**.

As shown in FIG. 9, the first clamping member 310 is equipped with two sets of claws 313 for matching the curved moving block **333*b*. The distance between the two sets of claws 313 is approximate to a height of the curved moving block 333*b* along the first direction U, The "approximate to" can be slightly greater than, slightly less than, or equal to. The claw 313 is provided with an engagement groove 313*a*, which is used to engage the curved moving block 333*b* between two sets of claws 313 through the adjusting bolt 333**.

It is worth mentioning that the curved moving block **333*b* has an oval cross section, and when the claw 313 and curved moving block 333*b* are matched, the claw 313 will move up and down with the curved moving block 333*b* and rotate with the curved surface of the curved moving block 333*b*. Since the adjustment process of the first clamping member 310 is to slide along the curved surface, the upper and lower parts of the curved moving block 333*b* contact with the first clamping member 310 are set as arcs; which can be used to absorb the rotation of the first clamping member 310** during the up and down motion.

In the embodiment, the procedure for adjusting the position of the first clamping member 310 relative to the slider body 100 is: the adjusting bolt 333 is placed into the first groove 190, the adjusting section passing through the baffle plate is connected by the adjusting nut 334, and then the adjusting nut 334 is fastened to fix the position of the adjusting bolt 333. Next, the two sets of claws 313 of the first clamping member 310 are respectively engaged to the top and bottom of the curved moving block **333*b*, the curved moving block 333*b* moves the first clamping member 310 up and down along the adjusting bolt 333. During operating, the adjusting nut 334 is needed to be released first such that the adjusting bolt 333 is rotatable, and the curved moving block 333*b* is then moved on the adjusting bolt 333 by rotating and adjusting bolt 333**.

In some embodiments, the first clamping member 310 has an extension rod/extension plate (not shown in the figure) with a threaded hole at the other end of the extension rod/extension plate. The adjuster 330 includes an adjusting bolt 333 and an adjusting nut 334. The adjusting bolt 333 is provided with a first limiting sheet **333*a* for limiting position. The threaded hole of the extension rod/extension plate is fitted to the adjusting bolt 333, the position of the first clamping member 310 relative to the slider body 100 is adjusted by rotating the adjusting bolt 333**. Other schemes in the embodiment are identical or similar to those in the previous embodiment and are not described here.

In some embodiments, as shown in FIGS. 4, 6, 8, and 9, the slider body 100 is provided with a first sliding groove 130. The first sliding groove 130 is provided with a scale bar 140 along the height direction of the slider body 100, the first clamping member 310 is provided with a first buckle 314, the first buckle 314 is engaged to the first sliding groove 130 and is provided with an indication line 314*a* corresponding to the scale bar 140 to read positions.

The first sliding groove 130 is a track for the first clamping member 310 to move in the first direction U on slider body 100. The length of the first sliding groove 130 (the length of the first sliding groove 130 refers to a length along curved direction of the slider body 100) is such that at least the first clamping member 310 can be moved relative to the slider body 100. The first sliding groove 130 can be either a regular groove (a regular groove is a groove with the same depth of the groove) or a stepped groove. The slider body 100 includes a first side surface 150 and a second side surface 160 arranged opposite to each other. The first side surface 150 is provided with a first sliding groove 130 concave from the first side surface 150 to the second side surface 160, or, as shown in FIG. 6, the first sliding groove 130 is a slot penetrating through the slider body 100, or the first sliding groove 130 is provided on the first side surface 150 and the slider body 100 respectively.

The first buckle 314 is a part formed by extending outward from the first mating surface 311 of the first clamping member 310, which is used to be inserted in the first sliding groove 130 and moved up and down along the first sliding groove 130 when the first mating surface 311 is connected to the rear of slider 120. The first sliding groove 130 and the first buckle 314 are arranged on the same side, for example, the first sliding groove 130 is arranged on the first side surface 150 of the slider body 100, then the first buckle 314 is arranged on the same side of the first clamping member 310. If the first sliding groove 130 is a regular groove, then the first buckle 314 can be a part with a rectangular or triangular section. When connection portion/engagement portion between the first clamping member 310 and the slider body 100 is disconnected, the first buckle 314 remains within the first sliding groove 130 at all times, and when the first clamping member 310 needs to be moved, the first clamping member 310 is movable relative to the slider body 100 by moving the first buckle 314 in the first sliding groove 130. If the first sliding groove 130 is a stepped groove, and the stepped groove is divided into a contacting portion and a guide portion, the cross section of the first buckle 314 is L-shaped. That is, the first buckle 31 includes a fastening portion 314*b* and an engagement portion 314*c*, and when the first clamping member 310 is connected with the slider body 100, the fastening portion 314*b* is fitted with the contacting portion and the engagement portion 314*c* is fitted with the guide portion so that the first buckle 314 can be moved along the first sliding groove 130.

In order for the user to know how far the first clamping member 310 will move relative to the slider body 100 and how much that position will eventually bend the window glass 500, the first sliding groove 130 is provided with a scale bar 140 along the first direction U (a height direction of slider body 100), the side of the first buckle 314 exposed to the outside is provided with an indication line 314*a*. By aligning the indication line 314*a* with the position of the scale bar 140, the user adjusts the matching position of the first clamping member 310 on the slider body 100 in turn.

In some embodiments, as shown in FIG. 5, the scale bar 140 has a maximum limit scale 141 and a minimum limit scale 142, the first clamping member 310 moved from the minimum limit scale 142 to the maximum limit scale 141, the first clamping member 310 moves up relative to the horizontal plane and rotate counterclockwise several unit angles. The first clamping member 310 works with the window glass 500 and the locking member 400 to drive the second clamping member 320 moving up along the engagement plate 200 and rotating counterclockwise relative to the horizontal plane, which is used to clamp the window glass 500 and adjust the tilt angle of the window glass 500.

Figure 13:
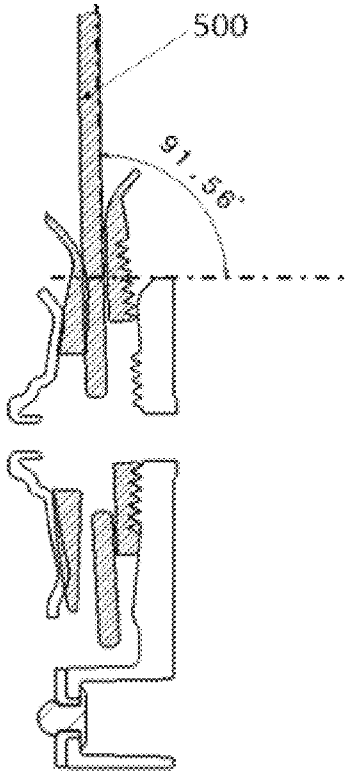
FIG. 13 is a side view of an overall structure of a slider device for a window glass lifter provided in one embodiment of the present application when it is set at a maximum limit scale.

The maximum limit scale 141 refers to a scale value read by the first buckle 314 when the first clamping member 310 moves up relative to the slider body 100 to a lowest matching position of the first clamping member 310 to match with the slider body 100. The lowest matching position of the first clamping member 310 above is taken the rack adjusting structure as an example, at this time, as shown in FIG. 13, the locking member 400 is adjusted to press the window glass 500, the first clamping member 310 and the second clamping member 320 clamp the glass below, such that the angle between the window glass 500 and the horizontal plane is smaller.

Figure 12:
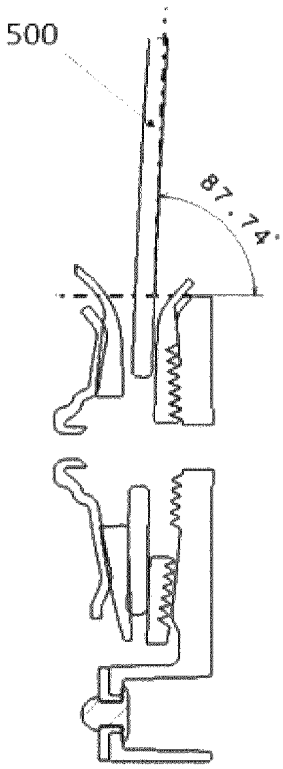
FIG. 12 is a side view of an overall structure of a slider device for a window glass lifter provided in one embodiment of the present application when it is set at a minimum limit scale.

The minimum limit scale 142 refers to a scale value read by the first buckle 314 when the first clamping member 310 moves down relative to the slider body 100 to a highest matching position of the first clamping member 310 to match with the slider body 100. The highest matching position of the first clamping member 310 above is taken the rack adjusting structure as an example, at this time, as shown in FIG. 12, the locking member 400 is adjusted to press the window glass 500, the first clamping member 310 and the second clamping member 320 clamp the glass above, such that the angle between the window glass 500 and the horizontal plane is larger.

In the embodiment, during the first clamping member 310 moves from the minimum limit scale 142 to the maximum limit scale 141, and the locking member 400 locks the slider body 100, the engagement plate 200 and the clamping assembly 300, the moving of the first clamping member 310 will drive the second clamping member 320 to slide on the curved surface of the engagement plate 200 along the third direction A. In the process of locking member 400 fixing the overall structure, the first clamping member 310 will rotate counterclockwise, while the second clamping member 320 will also rotate counterclockwise, and the window glass 500 rotates accordingly after the final move, thus the effect of adjusting the window glass 500 is achieved.

In some embodiments, as shown in FIGS. 4, 6, 8 and 9, a first circular hole 170 is provided on the slider body 100 and a second circular hole 240 on the engagement plate 200. A first strip groove 323 is provided on second clamping member 320 and a second strip groove 315 is provided on first clamping member 310.

The first circular hole 170 refers to a hole in the center of the slider body 100, which can be either a through hole or a threaded hole.

The second circular hole 240 refers to a hole in the center of the engagement plate 200, which can be either a through hole or a threaded hole.

The second strip groove 315 is a slot located on the center of the first clamping member 310, and the second strip groove 315 restricts the removable position of the first clamping member 310 with respect to the slider body 100.

The first strip groove 323 is a slot located on the center of the second clamping member 320, and the first strip groove 323 restricts the removable position of the second clamping member 320. Therefore, a length of the first strip groove 323 in the first direction U moves the first clamping member 310 to the maximum limit scale 141 and the minimum limit scale 142.

The first circular hole 170, the second circular hole 240, the first strip groove 323, and the second strip groove 315 are arranged for convenient the locking member 400 passing through the slider body 100, the clamping assembly 300, and the engagement plate 200, sequentially to connect the slider body 100 and the engagement plate 200, so as to clamp the window glass 500 inside the clamping assembly 300.

When the position of the first clamping member 310 relative to the slider body 100 needs to be adjusted, it is not necessary to take out the locking member 400 for adjustment, but only to release the locking member 400. Next, the first clamping member 310 is moved, the first buckle 314 of the first clamping member 310 is moved along the first sliding groove 130, and the first clamping member 310 further moves along the locking member 400. Finally, the relative position of the first clamping member 310 and the slider body 100 is fixed by the adjuster 330. Since the engagement plate 200 is provided with the second strip groove 315, after the position of the first clamping member 310 is moved, since the slider body 100, the engagement plate 200 and the clamping assembly 300 are matched with concave and convex surfaces, thus the moving of the first clamping member 310 will drive the second clamping member 320 moves with it when being connected, and the second strip groove 315 of the second clamping member 320 moves along the locking member 400.

It should be noted that when the first clamping member 310 is arranged to the maximum limit scale 141 or the minimum limit scale 142, Both the second strip groove 315 and the first strip groove 323 have at least a partially penetrating area for locking member 400 to pass through the first clamping member 310 and the second clamping member 320, respectively, so as to connect the slider body 100 to the engagement plate 200.

In some embodiments, as shown in FIGS. 4, 6, 8, and 9, the engagement plate 200 is provided with a second sliding groove 250; the second clamping member 320 is provided with a second buckle 324, and the second buckle 324 is attached to the second sliding groove 250.

The second sliding groove 250 is a track for the second clamping member 320 to move in a third direction A on the engagement plate 200. The length of the second sliding groove 250 (the length of the second sliding groove 250 refers to the length along the third direction A) is such that at least the second clamping member 320 can be adapted to the first clamping member 310 is in the position of the maximum limit scale 141 or the minimum limit scale 142. The second sliding groove 250 can be either a regular groove or a stepped groove, which is not limited herein. The diagram of the stepped groove used in the figures of the embodiment is not meant to be limited to the shape represented in the figures. The second sliding groove 250 can be installed on either side of the engagement plate 200 or on both sides of the engagement plate 200.

The second buckle 324 refers to a part that extends outward from the fourth mating surface 322 of the second clamping member 320, which is used to be inserted into the second sliding groove 250 when the second clamping member 320 is connected with the engagement plate 200, and moves up and down along the second sliding groove 250 and locking member 400. In the embodiment, the second buckle 324 and the second sliding groove 250 need to be installed on the same side.

If the second sliding groove 250 is a regular groove, the second buckle 324 can be a part with a rectangular or triangular cross-section. After the second clamping member 320 is engaged with the engagement plate 200, the second buckle 324 is always moved in the second sliding groove 250, so as to achieve that the second clamping member 320 moves freely with respect to the engagement plate 200. If the second sliding groove 250 is a stepped groove, the cross section of the second buckle 324 is L-shaped, and the shape of L-shaped is used to match the second sliding groove 250, such that after the second clamping member 320 is engaged with the engagement plate 200, the second buckle 324 is always moved in the second sliding groove 250, and the second buckle 324 also restrict the distance between the second clamping member 320 and the engagement plate 200.

In the embodiment, during the locking member 400 being in the process of connecting the slider body 100 and the engagement plate 200, the second clamping member 320 adaptively adjusts its position in the second sliding groove 250 according to the position of the first clamping member 310.

In some embodiments, as shown in FIGS. 4, 6, 8, and 9, the first clamping member 310 and the second clamping member 320 are provided with a second groove 316 and a second groove 325 for increasing flexibility, respectively. The second groove 316 and the second groove 325 are located near the first buckle 314 or the second buckle 324.

The second groove 316 refers to a groove penetrating through the first clamping member 310 along the second direction B and located near the first buckle 314, and is used to provide elasticity for the first buckle 314 to be engaged to the first sliding groove 130 to prevent the first buckle 314 from breaking.

The second groove 325 refers to a groove penetrating through the second clamping member 320 along the second direction B and located near the second buckle 324, and is used to provide elasticity for the second buckle 324 to be engaged to the second sliding groove 250 to prevent the second buckle 324 from breaking. The vicinity of the second buckle 324 above refers to the range not more than 2 cm from the second buckle 324.

Providing flexibility through the second groove 316 and the second groove 325, so that when the first buckle 314 and the second buckle 324 are engage to the first sliding groove 130 and second sliding groove 250, respectively, which can convenient to open the free ends of the first buckle 314 and the second buckle 324, it is convenient for connecting and effectively protecting the first buckle 314 and the second buckle 324.

In some embodiments, the second circular hole 240 is a threaded hole and the locking member 400 is a spindle bolt 410 with a second limiting sheet 420.

The second circular hole 240 refers to a threaded hole arranged on the engagement plate 200, and the internal thread of the second circular hole 240 is compatible with the external thread of the locking member 400.

The locking member 400 includes the second limiting sheet 420 and the spindle bolt 410, and the spindle bolt 410 refers to a part that sequentially passes through the slider body 100, the first clamping member 310, the window glass 500, and the second clamping member 320. The second limiting sheet 420 refers to a part arranged on the spindle bolt 410. The diameter of the first circular hole 170 is larger than the diameter of the spindle bolt 410 and smaller than the diameter of the second limiting sheet 420.

In the embodiment, the tail end of the spindle bolt 410 sequentially passes through the slider body 100, the first clamping member 310, the window glass 500, and the second clamping member 320, to contact the position of the second circular hole 240 of the engagement plate 200, and the spindle bolt 410 is rotated to screw the tail end of the spindle bolt 410 into the second circular hole 240 until the second limiting sheet 420 contacts with the outer surface of the slider body 100. The slider device for a window glass lifter is limited by the second limiting sheet 420 and the second circular hole 240.

In the embodiment, the spindle bolt 410 sequentially passes through the slider body 100, the first clamping member 310, the window glass 500, and the second clamping member 320, to contact the position of the second circular hole 240 of the engagement plate 200, and the spindle bolt 410 is rotated to screw the tail end of the spindle bolt 410 into the second circular hole 240 until the spindle bolt 410 is also in the first circular hole 170. The slider device for a window glass lifter is limited by the spindle bolt 410 and the second circular hole 240.

In some embodiments, as shown in FIGS. 4, 6, 8, and 9, a connection portion 180 extending from the slider body 100 to the engagement plate 200 is provided on the slider body 100. The engagement plate 200 is provided with a matching portion 260 engaged to the slider body 100.

In some embodiments, the engagement plate 200 is provided with a connection portion 180 extending from the engagement plate 200 to the slider body 100, and the slider body 100 is provided with a matching portion 260 engaged to the engagement plate 200.

The connection portion 180 is connected to the matching portion 260 so that the slider body 100 is connected to the engagement plate 200, and there is a distance between the rear of slider 120 and the rear of plate 220, which is used to place the clamping assembly 300.

In some embodiments, the connection portion 180 includes a guide column 181 and a connection column 182, and the connection column 182 is provided with a center hole 182*a*. The matching portion 260 includes an alignment hole 261 for connecting the center hole 182*a* and a guide hole 262 for matching with the guide column 181. The side of alignment hole 261 for assembly connection is provided with a protrusion 261*a* for plugging into the center hole 182*a*; the connecting member 270 passes through the center hole 182*a* and the alignment hole 261 to connect the slider body 100 and the engagement plate 200.

In order to clearly explain the specific connection relationship, the connection portion 180 is arranged on the slider body 100, and the matching portion 260 is arranged on the engagement plate 200 as an example, which is explained in detail below.

The connection portion 180 includes a guide column 181 and a connection column 182, the guide column 181 and the connection column 182 are obtained by extending outward along the slider body 100.

The guide column 181 is used to guide the assembly of the connection column 182 and the engagement plate 200.

The connection column 182 is used to connect the slider body 100 and the engagement plate 200, the connection column 182 is provided with a center hole 182*a* for the connecting member 270 to be convenient passing through. Correspondingly, the bottom of the first clamping member 310 is provided with an arc-shaped groove 317, a shape of the arc-shaped groove 317 is the same or similar to that of the connection column 182. When the first clamping member 310 slides to the minimum limit scale 142, the movement position of the first clamping member 310 can be limited by the arc-shaped groove 317 abutting against the connection column 182.

The matching portion 260 includes an alignment hole 261 and a guide hole 262, both of which are through holes.

When the slider body 100 is connected with the engagement plate 200, the guide column 181 on the connection portion 180 is inserted into the guide hole 262 for preliminary positioning. Then the connecting member 270 is connected with the slider body 100 and the engagement plate 200 by passing through the connection column 182 and the alignment hole 261 sequentially.

In order to further improve the progress of aligning of the connection column 182 and the alignment hole 261, the side of alignment hole 261 for assembly connection is provided with a protrusion 261*a* for plugging into the center hole 182*a*, in the pre-positioning stage, the protrusion 261*a* is placed on the center hole 182*a* of the connection column 182, and then the connecting member 270 is sequentially passed through the connection column 182 and the alignment hole 261 to connect the slider body 100 and the engagement plate 200.

In some embodiments, the engagement plate 200 adopts a steel plate with a thickness less than the slider body 100.

In some embodiments, the engagement plate 200 is provided with an stiffener 280 for stiffening the engagement plate 200.

In some embodiments, ends of the first clamping member 310 and the second clamping member 320 inserted into the window glass 500 have a first guide portion 318 and a second guide, portion 326, respectively, an angle between the first guide portion 318 and the first mating surface 311 is obtuse, an angle between the second guide portion 326 and the fourth mating surface 322 is obtuse, and the bending directions of the first guide portion 318 and the second guide portion 326 are opposite to each other.

Preferably, the first guide portion 318 and the second guide portion 326 are smooth curved surfaces, so as to facilitate the insertion of the window glass 500 between the first clamping member 310 and the second clamping member 320.

The present application provides a window glass lifter X, which includes at least one slider device 620 and at least one guide rail 610. At least one slider device 620 for clamping the window glass 500 is provided on each guide rail 610.

Since the window glass lifter X of the embodiment of the present application adopts all the technical scheme of the slider device 620 for the window glass lifter in the above embodiment, which also has all the beneficial effects brought about by the technical scheme of the above embodiment, which will not be repeated herein.

The present application further provides a vehicle including a vehicle door 600, the vehicle door 600 includes a window glass 500 and a window glass lifter X in the above embodiments. The window glass lifter X is placed inside the vehicle door 600, the window glass lifter X includes a slider device 620 and a guide rail 610, the slider device 620 clamps the window glass 500 and move along the guide rail 610.

Since the vehicle of the embodiment of the present application adopts all the technical solutions of the window glass lifter X in the above embodiments, which also has all the beneficial effects brought about by the technical scheme of the above embodiment, which will not be repeated herein.

The above is only a better embodiment of the present application and is not intended to limit the present application, and any modification, equivalent replacement, improvement, etc. made within the spirit and principles of the present application shall be covered by the present application.

What is claimed is:

1. A slider device for a window glass lifter, comprising:

a slider body;

an engagement plate, spaced apart from and connected to the slider body to form an accommodation space therebetween;

a clamping assembly, placed in the accommodation space and comprising a first clamping member and a second clamping member for clamping a window glass, wherein an adjuster is arranged between the first clamping member and the slider body, and the second clamping member is engaged on the engagement plate; first mating surfaces of each of the first clamping member and the second clamping member are attached to the window glass, and second mating surfaces of each of the first clamping member and the second clamping member away from the window glass are respectively curved surfaces of opposite bending directions; the slider body is provided with a curved surface configured for matching with the first clamping member, the engagement plate is provided with a curved surface configured for matching with the second clamping member, the second clamping member adaptively slides on the engagement plate with changing of a position of the first clamping member, the first mating surfaces of the first clamping member and the second clamping member are parallel to each other after the window glass is placed on the clamping assembly; and a locking member, sequentially passed through the slider body, the first clamping member, the second clamping member, and the engagement plate; the locking member is configured to adjust a distance between the slider body and the engagement plate until the first clamping member and the second clamping member are parallel to each other and clamping the window glass;

wherein the adjuster comprises a first toothed surface and a second toothed surface configured for fixing a relative position between the slider body and the first clamping member; the first toothed surface is arranged on a curved surface of the slider body facing the first clamping member, the second toothed surface is arranged on a curved surface of the first clamping member facing the slider body, and the first toothed surface and the second toothed surface are meshed with each other.

2. The slider device for the window glass lifter according to claim 1, wherein the adjuster comprises an adjusting bolt and an adjusting nut, and the slider body is provided with a first groove configured for accommodating the adjusting bolt;

the adjusting bolt is provided with a first limiting flange and a curved moving block provided with an internal thread, the adjusting bolt is restricted inside the first groove through the first limiting flange, the first groove is matched with the adjusting bolt to restrict a rotating freedom of the moving block, and the adjusting nut is connected to the adjusting bolt from a bottom of the slider body; and the first clamping member is provided with two sets of claws, and the moving block is positioned between the two sets of claws.

3. The slider device for the window glass lifter according to claim 1, wherein the slider body is provided with a first sliding groove, the first sliding groove is provided with a scale bar along a height direction of the slider body, the first clamping member is provided with a first buckle engaged to the first sliding groove, and the first buckle is provided with an indication line corresponding to the scale bar.

4. The slider device for the window glass lifter according to claim 3, wherein the scale bar has a maximum limit scale and a minimum limit scale, the first clamping member moves from the minimum limit scale to the maximum limit scale, the first clamping member moves up several unit angles along an arc direction of the slider body, and the locking member is engaged with the window glass to drive the second clamping member to slide along an arc direction of the engagement plate.

5. The slider device for the window glass lifter according to claim 4, wherein the slider body is provided with a first circular hole, the engagement plate is provided with a second circular hole, the second clamping member is provided with a first strip groove, the first clamping member is provided with a second strip groove; and the first clamping member is arranged on the maximum limit scale or the minimum limit scale, and the second strip groove and the first strip groove pass through the locking member to connect the slider body and the engagement plate.

6. The slider device for the window glass lifter according to claim 5, wherein the second circular hole is a threaded hole, the locking member is a spindle bolt with a second limiting flange, the spindle bolt passes through the slider body, the first clamping member, and the second clamping member, and is connected to the second circular hole of the engagement plate; and the second limiting flange is abutted against an outer surface of the slider body.

7. The slider device for the window glass lifter according to claim 3, wherein the engagement plate is provided with a second sliding groove; and the second clamping member is provided with a second buckle engaged to the second sliding groove, such that when the locking member is connected to the slider body and the engagement plate, the position of the second clamping member in the second sliding groove is adjusted according to a position of the first clamping member.

8. The slider device for the window glass lifter according to claim 7, wherein both the first clamping member and the second clamping member are provided with a second groove for increasing elasticity of the first clamping member and the second clamping member, and the second groove is arranged adjacent to the first buckle or the second buckle.

9. The slider device for the window glass lifter according to claim 1, wherein the slider body is provided with a connection portion extending from the slider body to the engagement plate, and the engagement plate is provided with a matching portion engaged to the slider body; or the engagement plate is provided with a connection portion extending from the engagement plate to the slider body, and the slider body is provided with a matching portion engaged to the engagement plate.

10. The slider device for the window glass lifter according to claim 9, wherein the connection portion comprises a guide column and a connecting column; and the connecting column is provided with a center hole;

the matching portion comprises an alignment hole for connecting the center hole and a guide hole for matching with the guide column; a side of the alignment hole toward a position for assembly connection is provided with a projection for inserting in the center hole; and the slider device further comprises a connecting member sequentially passing through the center hole and the alignment hole to connect the slider body and the engagement plate, and to limit a movement and rotation direction of the engagement plate relative to the slider body.

11. The slider device for the window glass lifter according to claim 1, wherein the engagement plate is provided with a stiffener for increasing a rigidity of the engagement plate.

12. The slider device for the window glass lifter according to claim 1, wherein an end of the first clamping member where the window glass is inserted is provided with a first guide portion that intersects the first clamping member at an obtuse angle; and an end of the second clamping member where the window glass is inserted is provided with a second guide portion that intersects the second clamping member at an obtuse angle.

13. A window glass lifter, comprising:

at least one slider device according to claim 1; and at least one guide rail, the at least one guide rail provided with at least one slider device for clamping a window glass.

14. A vehicle, comprising a vehicle door; wherein the vehicle door comprises a window glass and a window glass lifter according to claim 13 placed inside the vehicle door, and the window glass lifter comprises the at least one slider device and the at least one guide rail; and the at least one slider device clamps the window glass to move along the at least one guide rail.

* * * * *